United States Patent [19]

Jain et al.

[11] Patent Number: 6,021,495
[45] Date of Patent: Feb. 1, 2000

[54] METHOD AND APPARATUS FOR AUTHENTICATION PROCESS OF A STAR OR HUB NETWORK CONNECTION PORTS BY DETECTING INTERRUPTION IN LINK BEAT

[75] Inventors: Vipin Kumar Jain, Santa Clara; Danny M. Nessett, Fremont; William Paul Sherer, Danville, all of Calif.

[73] Assignee: 3Com Corporation, Santa Clara, Calif.

[21] Appl. No.: 08/866,818

[22] Filed: May 30, 1997

Related U.S. Application Data

[60] Provisional application No. 60/032,842, Dec. 13, 1996.

[51] Int. Cl.⁷ ..................................................... G06F 12/00
[52] U.S. Cl. .......................... 713/201; 713/200; 713/202; 709/225; 709/229
[58] Field of Search ............................... 395/186, 187.01, 395/188.01, 200.55, 200.59; 370/427, 446; 380/23, 25; 713/200, 201, 202; 709/225, 229

[56] References Cited

U.S. PATENT DOCUMENTS

| | | | |
|---|---|---|---|
| 4,896,319 | 1/1990 | Lidinsky et al. | 370/427 |
| 5,278,904 | 1/1994 | Servi | 380/23 |
| 5,537,099 | 7/1996 | Liang | 340/825.07 |
| 5,546,463 | 8/1996 | Caputo et al. | 380/25 |
| 5,687,174 | 11/1997 | Edem et al. | 370/446 |
| 5,706,427 | 1/1998 | Tabuki | 709/227 |
| 5,815,664 | 9/1998 | Asano | 709/227 |

FOREIGN PATENT DOCUMENTS 0 573 248 A1 8/1993 European Pat. Off. .......... G06F 1/00

OTHER PUBLICATIONS

Lloyd et al., PPP Authentication Protocols, Internet Engineers Task Force, Network Working group, Request for Comment : 1334, Oct. 1992.

Lloyd, B.; Simpson, W.; "PPP Authentication Protocols," *Internet Engineer Task Force*, Request for Comments: 1334.

Finseth, C; "An Access Control Protocol, Sometimes called TACACS," *Internet Engineer Task Force*, Request for Comments: 1492.

Simpson, W.; "PPP Challenge Handshake Authentication Protocol (CHAP)," *Internet Engineer Task Force*, Request for Comments: 1994.

Rigney, C.; Rubens, A.; Simpson, W.; Willens, S.; "Remote Authentication Dial in User Service (RADIUS)," *Internet Engineer Task Force*, Request for Comments: 2058.

*Primary Examiner*—Meng-Ai T. An
*Assistant Examiner*—El-Hady Nabil
*Attorney, Agent, or Firm*—Townsend and Townsend and Crew LLP

[57] ABSTRACT

A network intermediate system authenticates end systems attached to ports of the intermediate system. An authentication routine is called on a port each time an intermediate system detects any interruption in the physical connection with the port, including reboot of the end system connected to the port. Network data is not fully transmitted or received to any port that has not been authenticated. The invention distributes a user authentication to the point where an end system initially connects to a network, to prevent an authorized reception or transmission of network data that is not prevented under existing network login systems. The invention may be incorporated into an intermediate system, into intermediate system software, or into applications specific integrated circuits designed for use in an intermediate system. The invention may include components that interact specifically with installed components in an end system or elsewhere in a network.

14 Claims, 3 Drawing Sheets

| LAYER NAME (NUMBER) | DEVICES | DATA | PROTOCOLS |
|---|---|---|---|
| HIGHER LAYER PROTOCOLS | | | |
| APPLICATION LAYER (5) | | FILES | FTP, HTTP |
| TRANSPORT LAYER (4) | ROUTERS | ROUTING PACKETS | TCP, UDP |
| ROUTING LAYER (3) | ROUTERS | ROUTING PACKETS | IP |
| DATA LINK LAYER (2) | BRIDGES | PACKETS | ETHERNET |
| PHYSICAL LAYER (0,1) | REPEATERS | BITS | ETHERNET |

HIGH

LOW

METHOD AND APPARATUS FOR AUTHENTICATION PROCESS OF A STAR OR HUB NETWORK CONNECTION PORTS BY DETECTING INTERRUPTION IN LINK BEAT

BACKGROUND OF THE INVENTION

This application claims priority from provisional patent application Ser. No. 60/032,842, filed Dec. 13, 1996.

Related disclosure is discussed in co-assigned patent application Ser. No. 08/733,358, filed Oct. 17, 1996, now abandoned, which is a continuation of U.S. Pat. No. 5,568,469, filed Sep. 27, 1994 and issued Oct. 11, 1996 incorporated herein by reference.

The current invention relates to the field of electronic circuits. More particularly, the current invention relates to improvements in networked computer environments and has particular applications to the transmission of information between digital devices over a communications medium. A very wide variety of types of computer systems and networks exist, each having variations in particular implementations. The present invention will be described with reference to particular types of systems for clarity but this should not be taken to limit the invention, and it will be apparent to those of skill in the art that the invention has applications in many different types of computer systems. The invention therefore should not be seen as limited except as specifically herein provided.

Networking Devices Standards

This specification presumes familiarity with the general concepts, protocols, and devices currently used in LAN networking and WAN internetworking applications such as, for example, the IEEE 802 and ISO 8802 protocol suites and other series of documents released by the Internet Engineering Task Force that are publicly available and discussed in more detail in the above-referenced patent applications and will not be fully discussed here.

FIG. 1

FIG. 1 illustrates a local area network (LAN) 40 of a type that might be used today in a moderate-sized office or academic environment and as an example for discussion purposes of one type of network in which the present invention may be effectively employed. LANs are arrangements of various hardware and software elements that operate together to allow a number of digital devices to exchange data within the LAN and also may include internet connections to external wide area networks (WANs) such as WANs 82 and 84. Typical modern LANs such as 40 are comprised of one to many LAN intermediate systems (ISs) such as ISs 60–62 and 67 that are responsible for data transmission throughout the LAN and a number of end systems (ESs) such as ESs 50a–d, 51a–c, and 52a–g, that represent the end user equipment. The ESs may be familiar end-user data processing equipment such as personal computers, workstations, and printers and additionally may be digital devices such as digital telephones or real-time video displays. Different types of ESs can operate together on the same LAN. In one type of LAN, LAN ISs 60–61 are referred to as bridges and WAN ISs 64 and 66 are referred to as routers, and IS 67 is referred to as a repeater, however many different LAN configurations are possible, and the invention is not limited in application to the network shown in FIG. 1.

The LAN shown in FIG. 1 has segments 70a–e, 71a–e, and 72a–e, and 73a. A segment is generally a single interconnected medium, such as a length of contiguous wire, optical fiber, or coaxial cable or a particular frequency band. A segment may connect just two devices, such as segment 70a (also referred to as a point-to-point connection or a star connection), or a segment such as 72d may connect a number of devices using a carrier sense multiple access/collision detect (CSMA/CD) protocol or other multiple access protocol such as a token bus or token ring. A signal transmitted on a single segment, such as 72d, is simultaneously heard by all of the ESs and ISs connected to that segment.

LANs also may contain a number of repeaters, such as repeater 67. A repeater generally physically repeats out of each of its ports all data received on any one port, such that the network behavior perceived by ESs 50a–c and the port of IS 60 connected to 67 is identical to the behavior these ports would perceive if they were wired on the same segment such as 52d–g and the corresponding port of 62. Repeaters configured in a star topology, such as 67, are also referred to as hub repeaters. (The terms hub or star is a term used in networking that sometimes indicates either a switch/bridge layer 2 device or a repeater layer 1 device depending on the context.) In the network shown in FIG. 1, bridges 61, 62, and 63, now be considered to have a star or hub configuration, as can repeater 67.

The term node is often used in describing networks to indicate any transmitter or receiver in the network. Repeater 67, for example, is a network intermediate system connected to four nodes, three of those being end systems and one being a different intermediate system bridge 60.

Drivers, Adaptors, and LAN Topology

Each of the ISs and ESs in FIG. 1 includes one or more adaptors and hardware or software instructions sometimes referred to as drivers. An adaptor generally includes circuitry and connectors for communication over a segment and translates data from the digital form used by the computer circuitry in the IS or ES into a form that may be transmitted over the segment, e.g., electrical signals, optical signals, radio waves, etc. An ES such as 50b will generally have one adaptor for connecting to its single segment. A LAN IS such as 61 will have five adaptors, one for each segment to which it is connected. A driver is a set of instructions resident on a device that allows the device to accomplish various tasks as defined by different network protocols. Drivers are generally software programs stored on the ISs or ESs in a manner that allows the drivers to be modified without modifying the IS or ES hardware.

LANs may vary in the topology of the interconnections among devices. In the context of a communication network, the term "topology" refers to the way in which the stations attached to the network are interconnected. Common topologies for LANs are bus, tree, ring, and star. LANs may also have a hybrid topology made up of a mixture of these. The overall LAN pictured in FIG. 1 has essentially a tree topology, but incorporating one segment, 72d, having a bus topology, and incorporating one segment 70d having a star topology. A ring topology is not shown in FIG. 1, but it will be understood that the present invention may be used in conjunction with LANs having a ring topology.

Network Intermediate Systems: Routers, Bridges, Repeaters

The LAN ISs in LAN 40 include bridges 60–63. Bridges are understood in the art to be a type of computer optimized for very fast data communication between two or more segments. A bridge according to the prior art generally makes no changes to the packets it receives on one segment before transmitting them on another segment. Bridges are not necessary for operation of a LAN and, in fact, in prior art systems bridges are generally invisible to the ESs to which they are connected and sometimes to other bridges and routers.

LANs also may contain a number of repeaters, which is one configuration possible for device 67. A repeater generally repeats out of each of its ports all data received on any one port, such that the network behavior perceived by ESs such as 50d–f is generally identical to the behavior they would perceive if they were wired on the same segment such as 52d–g. In alternative network topologies, device 67 could be a bridge/switch as described in related patent applications.

Layers

An additional background concept important to understanding network communications is the concept of layered network protocols. Modern communication standards, such as the TCP/IP Suite and the IEEE 802 standards, organize the tasks necessary for data communication into layers. At different layers, data is viewed and organized differently, different protocols are followed, and different physical devices handle the data traffic as abstracted at that layer. FIG. 3 illustrates one example of a layered network standard having a number of layers, which we will refer to herein as the Physical Layer, the Data Link Layer, the Routing Layer, the Transport Layer and the Application Layer. These layers correspond roughly to the layers as defined within the TCP/IP Suite. (The 802 standard has a different organizational structure for the layers and uses somewhat different names and numbering conventions.)

An important idea in layered standards is the idea of layer independence. A layered protocol suite specifies standard interfaces between layers such that, in theory, a device and protocol operating at one layer can coexist with any number of different protocols operating at higher or lower layers, so long as the standard interfaces between layers are followed.

Network modularity creates increasing security concerns

In many office environments, networks such as that shown in FIG. 1 are designed to be highly modular. When a office building is constructed, typically network jack connections are provided throughout the office space, allowing computers to be flexibly installed in various offices or moved around as needed. In such a case, any of the ESs shown in FIG. 1 may represent unconnected jacks awaiting connection to an actual ES computer.

While this modularity is highly desirable in many office environments, it also creates security concerns in that a person with access to a workspace containing a network jack can connect a device to the jack and that device can hear some or all of the traffic on the network Furthermore, that device can potentially even send traffic out over the network to be routed via a gateway over the internet. In a worse-case scenario, a small box could be plugged into a network jack and forward all LAN traffic over the network's WAN connection to a remote location without a network owner being aware of the breach in security.

Another potential security problem in a network can occur when an authorized network end system, that is properly installed, is not attended for a period of time and can be accessed by an unauthorized person. In such a case, even where a user is unable to login to the network server, an unauthorized person could run software on the end system that would be capable of sending out packets on the network or of sniffing packets on the network, thereby gaining unauthorized access to network data or resources.

In prior art network systems, unauthorized access to a network server is prevented by requiring users to login to the server and by timing out an idle login either at the server or setting up a password-protected screensaver. However, neither of these mechanisms prevents an unauthorized person from rebooting an ES with a network connection or powering up a turned-off ES and thus gaining access to the network. Some prior art systems also include user verification at the point of a telephone dial-in SLIP or PPP connection to a network, but these systems are limited to a dial-in environment.

What is needed is a method and apparatus for improving security in a LAN and for preventing unauthorized equipment or an unauthorized person from connecting to a network and listening-in on network traffic. What is also needed is a method and apparatus for verifying the identity of a user prior to allowing the user to send or receive data on a network.

SUMMARY OF THE INVENTION

In general terms, the present invention comprises techniques and devices for a computer network with improved security. According to the invention, network intermediate systems, such as repeaters or switches, that provide point-to-point connections to one or more ESs are enabled to detect when an ES is first connected or is reconnected to a particular port and provide an authentication routine every time an ESs makes a new connection on a port. According to the invention, an IS will limit the forwarding of packets down its port to an ES and will limit forwarding data from an ES until an authentication process is complete.

A new connection to a point-to-point port on an IS is detected by the presence or resumption of a link-beat (sometimes referred to as heart-beat) signal that is maintained at the physical layer on the point-to-point connection whenever there is an active node/ES on a port. Authentication is accomplished at a user level through a challenge/response protocol or through a user entering a user-name and password.

According to one embodiment the invention may be incorporated in a network intermediate system with a star configuration which may perform authentication locally or in a preferred embodiment may communicate with a login server on the network to authenticate verification data which may consist of a user name and password of a user or of a challenge response data or other verification data supplied by the user.

Specific aspects of the invention will be better understood upon reference to the following detailed description and in conjunction with the drawings.

DETAILED DESCRIPTION OF SPECIFIC EMBODIMENTS

Figure 1:
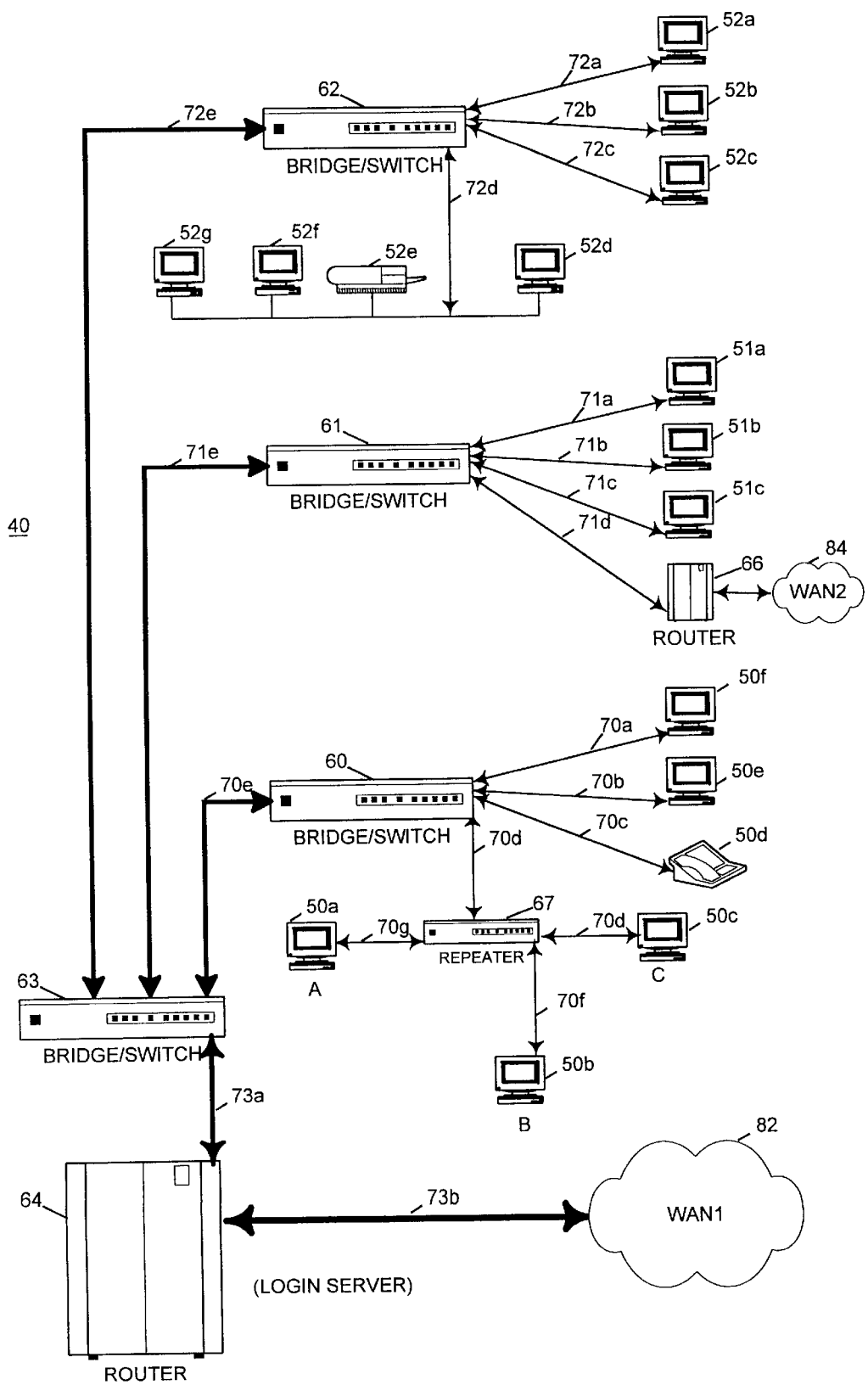
FIG. 1 is a diagram of a moderate sized network of one type in which the invention may be effectively employed.
Figures 2, 3:
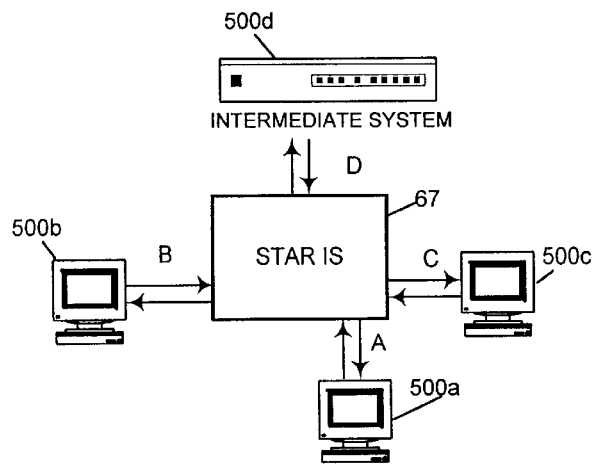
FIG. 2 is a diagram illustrating an IS connecting four transmitter/receivers in a star/hub connection to illustrate aspects of the invention.
FIG. 3 is a diagram illustrating a layered network protocol.

FIG. 2 is a block diagram of an IS connected to three ESs and one other IS that will be used to illustrate the invention.

Figure 4:
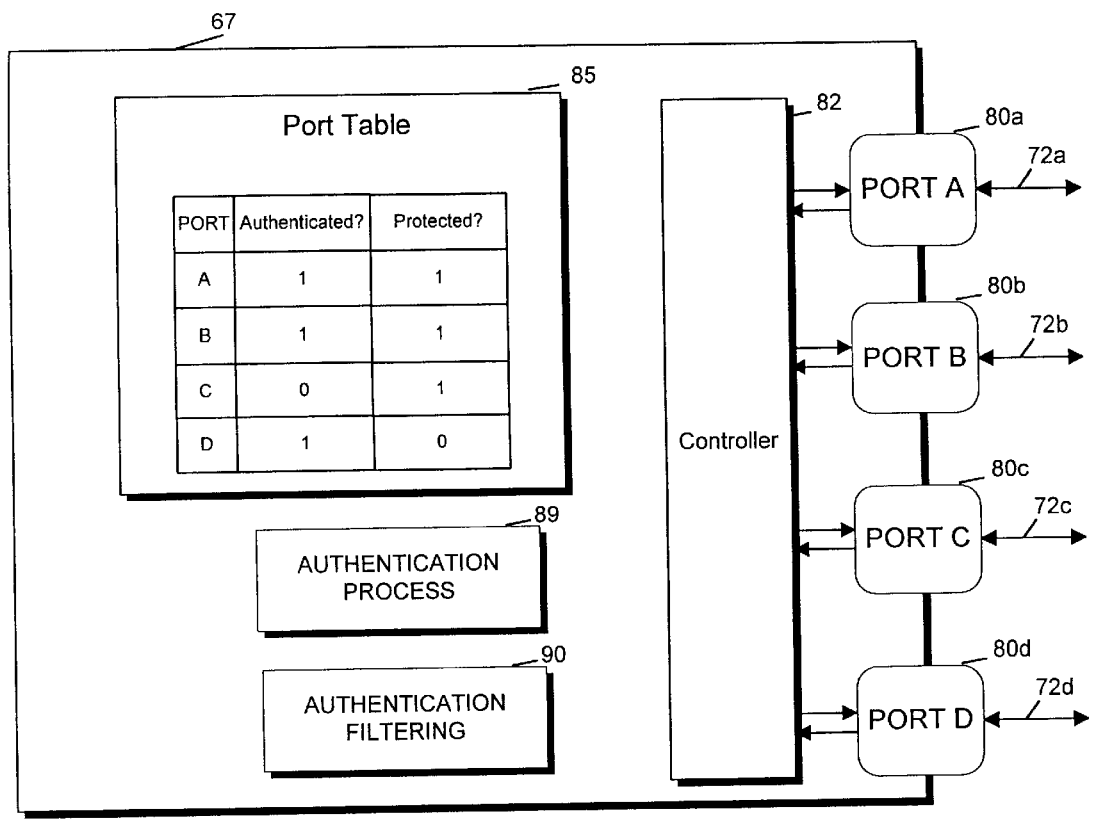
FIG. 4 is a block diagram of an IS star device according to one specific embodiment of the invention.

FIG. 4 is a block diagram representing an IS internal structure according to one embodiment of the invention. As discussed above, a star device according to the invention maintains state regarding which of its connected ports are authenticated and which are not and detects when the node connected to a port is disconnected. Such state may be in the form of a per-port state machine or in the form of a port table as shown in FIG. 4. An authentication process is called whenever a physical connection is detected on an unauthenticated port or whenever any attempt is made to transmit data on an unauthenticated port. Network transmission is limited on a port until a port connection has been authenticated.

Physical Layer Linkbeat Detection

In contrast to prior art network and LAN systems, an embodiment of the present invention authenticates a user at a first LAN intermediate system to which the user is connected on a per port basis, then authenticates a user each time there is any interruption in the physical link with an end system connected to a particular network port. In order to accomplish this, the invention uses a mechanism at the physical layer to determine whether an end system is either newly connected to a port is rebooted or powercycled at a port.

In one specific embodiment, point-to-point ethernet linkbeat, as is known in the art, is used to determine whether there has been any interruption in the physical connection to an end system.

As is known in the art, point-to-point ethernet defines a linkbeat packet whereby during periods of silence, adapters at both ends of a point-to-point ethernet connection send periodic very small packets, called linkbeat packets to inform the adapter at the other end that an adapter is connected to a port. In prior art systems, the presence or absence of this linkbeat packet are only used at the lowest physical layer to manage transmissions and are not made known to higher layer protocols.

According to the current invention, however, a controller, such as 82, is enabled to respond to an interruption in the linkbeat on a port by resetting an authentication bit in a port table 85.

A resumption of linkbeat on a port or an attempt to send data on a port that is unauthenticated will be detected by controller 82 and will cause the controller to initiate an authentication process 89 as described below.

Other mechanisms for detecting the interruption in a physical connection are possible for use in conjunction with the invention, and according to the invention, any mechanism appropriate for a particular physical interface that can accurately signal a disconnection from the physical interface or a reboot of an end system connected to the physical interface may be used with the authentication scheme of the invention.

Authenticating a Port

According to the invention, an authentication process is called whenever data is attempted to be transmitted or link-beat resumes on an unauthenticated port.

In one embodiment, this authentication process may take place using a login server as is known in the prior art and a challenge protocol presented to the user. In such embodiment, when authentication process 89 is invoked by controller 82, the authentication process will cause a message to be sent to an unauthenticated end system, such as 50a requesting authentication data. Such data may be in the form of a user name and password, as is known in the art, or in the form of a challenge/response protocol, where the intermediate system selects a challenge value and a user must provide a corresponding value according to a secret code. In response, the end system 50a transmits authentication data back to the intermediate system 67 for authentication.

Intermediate system 67 then uses that authentication data to authenticate the user on an unauthenticated port. This may be done locally, in which case the intermediate system 67 will keep an authentication table local to it or it may be done using a remote login server as is known in the art. In the latter case, authentication process 89 will compose an appropriate protocol message to the login server, and that message will be transmitted over the local area network. As is known in the art, the login server may be any processor running on the network that can receive authentication messages. The login server then transmits back a message indicating whether the authentication data is valid when compared against data stored at the login server. This message is received by authentication process 89. In response thereto, authentication process 89 can set the authentication bit in port table 85, indicating that the port is authenticated.

In one embodiment, the authentication process will require a user to enter a password each time the authentication process is run rather than allowing the process to be run using a stored password at an end system. In this way, access to the network can be prevented by an authorized person using an authorized and properly connected end system.

Controlling Access to the Network

According to the invention, an intermediate system, such as 67, with a direct connection to a number of end systems, prevents unauthorized access to a network by controlling the flow of network data to end systems that have not been authenticated.

In one embodiment, an intermediate system, such as 67, simply allows no data to flow to and from an end system that is unauthenticated, except for the minimum data needed to interact with the authentication process 89. In this embodiment, an end system would have to be configured such that the authentication may be accomplished prior to any other access to a network being necessary.

In an alternative embodiment, an unauthenticated end system may be allowed limited access to the network in order to accomplish initial network login and configuration prior to completing the authentication process. One mechanism for doing so according to the invention is to include a protected field in a port table, such as 85. According to this embodiment, an unauthenticated port will be allowed to transmit data out of an unprotected port only and will remain restricted until an authentication process is complete.

Other embodiments are possible whereby an intermediate system 67 includes a further filtering process for unauthenticated ports, allowing packets to flow only to particular addresses or restricting the protocol of packets flowing to or from any unauthenticated port. In such case, a filtering process, such as 90, may be invoked only on unauthenticated ports to examine either addresses or protocols of packets to and from such ports and prevent the flow of packets that do not meet the filter process definitions. A filtering process may also be invoked on packets in accordance with a Virtual LAN architecture, such as described in co-assigned U.S. Pat. No. 5,752,003 entitled *ARCHITECTURE FOR MANAGING TRAFFIC IN A VIRTUAL LAN ENVIRONMENT* filed Jul. 14, 1995, and Ser. No. 08/683,570 entitled *VIRTUAL NETWORKING ARCHITECTURE FOR CONNECTIONLESS LAN BACKBONE* filed Jul. 15, 1996, incorporated herein by reference to the extent needed to understand this embodiment of the present invention.

In a further embodiment, the invention is designed to work in a managed intermediate system, as is known in the art, managed by a standard network protocol, such as SNMP, or other network protocol. In such a system, a network manager may set various authenticating characteristics.

In a further embodiment, the invention may network with an intermediate system incorporating an end system detecting algorithm, allowing intermediate system to detect whether a single end system is connected to a port, such as port A, or rather another intermediate system, such as a repeater, is connected to a port.

In a further embodiment, the invention is designed to require modifying an intermediate system only. In such a case, an intermediate system according to the invention works with preexisting adapter driver software and operating system software on end systems to call the authentication routines on an end system as defined by the preexisting operating system at the appropriate time. In other embodiments, the invention will work with a specially designed adapter driver software on an end system, to perform the authentication routine.

Figure 5:
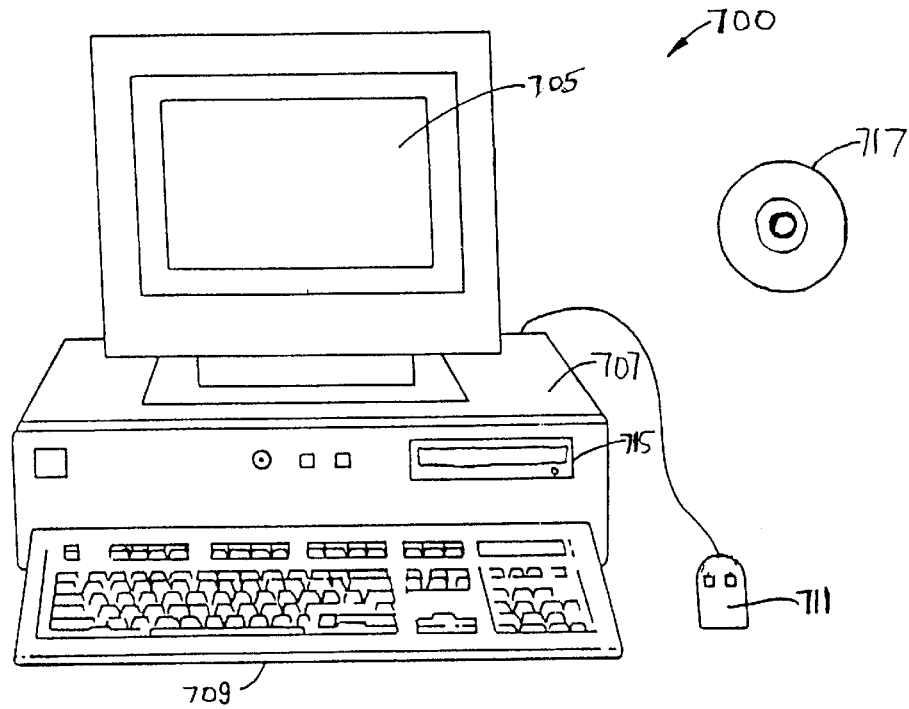
FIG. 5 is a diagram of a computer system with a fixed medium 717 which may be used to implement one embodiment of the invention.

The invention may be embodied in a set of executable computer program code which may be stored into a fixed computer medium such as a disk, diskette, volatile memory or non-volatile memory, or any other medium for storing computer code. In such a case when such instructions are loaded and executed in an appropriately configured network intermediate system, the intermediate system will perform as described herein. A representation of such a system 700 is shown in FIG. 5, containing CPU 707, optional input devices 709 and 711, disk drives 715 and optional monitor 705. Fixed media 717 may be used to program such a system and could represent a disk-type optical or magnetic media or a memory.

The invention also may be embodied within the circuitry of an application specific integrated circuit (ASIC). In such a case, the invention may be embodied in a computer understandable descriptor language which may be used by an ASIC foundry to create an ASIC device that operates as herein described. In this embodiment, computer system 700 may be understood as a computer system for reading instructions from media 717 for the manufacturing of an ASIC.

The invention has now been explained with reference to specific embodiments. Other embodiments will be obvious to those with skill in the art. In particular the invention has application in many different networking environments and schemes. It is therefore intended that the invention not be limited except as indicated in the attached claims.

What is claimed is:

1. In an intermediate network system having a plurality of ports for connection to network segments, a method for limiting transmission or reception of data with an unauthorized user comprising the step of:
    storing an indication variable for each of said plurality of ports of said intermediate system indicating whether said each of said ports is authenticated or unauthenticated;
    detecting an interruption of link-beat when an end-system attached to any one of said plurality of ports is not present or is rebooted on that port and setting the indication variable of that port to an unauthenticated state prior to freely transmitting or receiving network data on said port.

2. The method according to claim 1 wherein said step of authenticating a port comprises:
    receiving user verification data from said port and verifying said verification data.

3. The method according to claim 2 wherein said step of verifying comprises transmitting verification data to a login server on said network and receiving a confirmation from said login server.

4. The method according to claim 2 wherein said step of verifying comprises presenting a challenge on said port requesting that said port provide a secret value that would only be known to an authorized user.

5. The method according to claim 2 wherein after verification on said port verification data is used by an operating system on said end-system to verify a user to other network resources.

6. The method according to claim 1 wherein said intermediate system allows a limited amount of data to be transmitted and received on a port prior to authentication of that port.

7. The method according to claim 1 further comprising limiting data transmission with an unauthenticated port to a subset of other ports that are designated unprotected ports.

8. The method according to claim 1 further comprising limiting data transmission with an unauthenticated port to a subset of a network by forcing communications with said unauthenticated port to occur within a designated virtual local area network.

9. The method according to claim 1 wherein said detecting comprises detecting any resumption of link-beat on a port and authentication is attempted of any port where link-beat is resumed.

10. In an intermediate network system having a plurality of ports for connection to network segments, a computer program code contained in A fixed computer readable medium that when loaded into configured computer system and run will cause the computer to limit transmission or reception of data with an unauthorized user by performing the steps:
    storing an indication variable for each of said plurality of ports of said intermediate system indicating whether said each of said ports is authenticated or unauthenticated;
    detecting an interruption to link beat when an end system attached to any one of said plurality of ports is not present or is rebooted on that port; and
    setting the indication variable of that port to an unauthenticated state prior to freely transmitting or receiving network data on said port.

11. In an intermediate network system having a plurality of ports for connection of network segments, computer interpretable instructions describing a circuit layout for an integrated circuit contained in A fixed computer readable medium layout for an integrated circuit that, when constructed according to said descriptions and placed into an appropriately configured computer system, will cause the computer to limit transmission or reception of data with an unauthorized user by performing the steps:
    storing an indication variable for each of said plurality of ports of said intermediate system indicating whether said each of said ports is authenticated or unauthenticated;
    detecting an interruption to link beat when an end system attached to any one of said plurality of ports is not present or is rebooted on that port; and
    setting the indication variable of that port to an unauthenticated state prior to freely transmitting or receiving network data on said port.

12. A system having software and hardware means for ensuring network security comprising:

network intermediate system means capable of detecting the presence of a link beat on any of the network nodes and capable of performing a verification routine when linkbeat is interrupted on any of the network nodes;

network intermediate system control means capable of limiting transmission and reception of network data on a network port that is unauthenticated when link beat is interrupted on said port; and end system means capable of responding to authentication requests from said intermediate network system.

13. A secure hub system with at least one port comprising:

a first port state variable containing a first state for the at least one indicating whether an end system connected to said at least one port has been authenticated;

a second port state variable containing a second state for said at least one port indicating whether said at least one port in an unprotected port out of which data from unauthenticated ports may be transmitted or received;

a challenge protocol for receiving verification data from a user of the end system;

and a verification protocol for using said verification data to verify that said user of the end system is an authorized user.

14. In an intermediate network system having a plurality of ports for connection of network end systems A method for improving network security comprising the steps of:

storing a state variable indicating whether a network port connecting said intermediate system to an end system is authenticated;

initially setting said state variable to an unauthenticated state at intermediate system power up;

performing an authenticated process on said network port prior to an unrestricted transmission or reception of network data through said intermediate system of an unauthenticated port;

resetting said state variable from authentication state to an unauthenticated state whenever an interruption in the physical connection between said network port and said end system is detected; and setting said state variable to an authenticated state only when said authentication process returns a message that authentication has been validated.

* * * * *